April 22, 1930.                M. GZUPKAYTIE                 1,755,732
                                  RIM LUG
                           Filed April 6, 1929
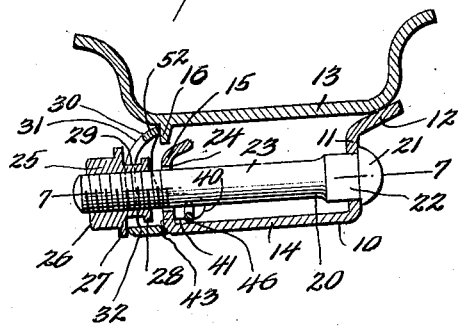
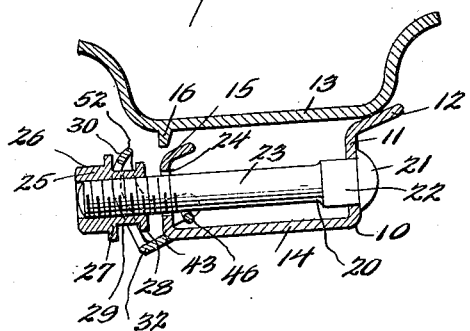
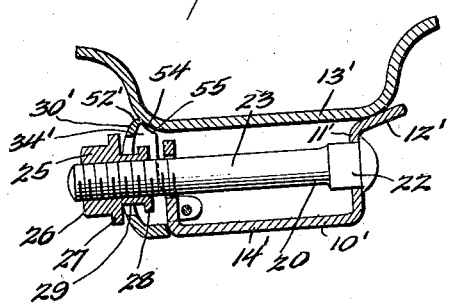
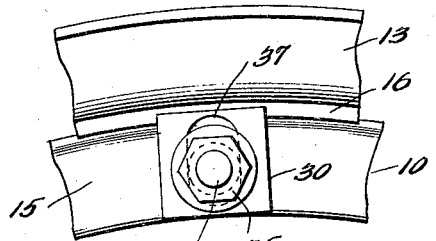
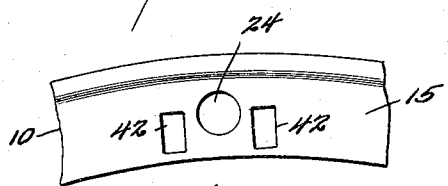
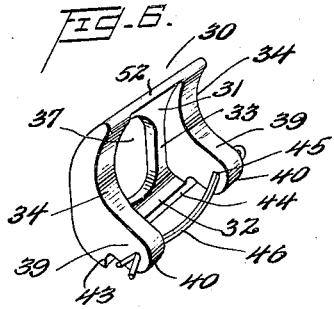
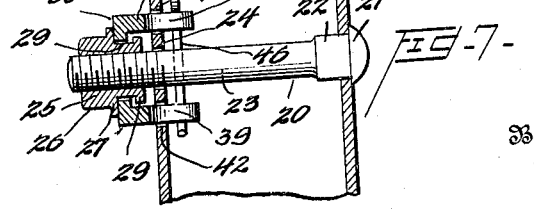
Inventor
Matt Gzupkaytie
By Watson, Coit, Morse & Grindle
                                    Attorney Patented Apr. 22, 1930

1,755,732

UNITED STATES PATENT OFFICE

MATT GZUPKAYTIE, OF BALTIMORE, MARYLAND

RIM LUG

Application filed April 6, 1929. Serial No. 353,140.

This application is a continuation in part of a prior application, Serial No. 285,122, filed June 13, 1928.

This invention relates to rim lugs, and more particularly to devices of this character constructed and arranged for clamping a demountable automobile tire rim to the felly of the automobile wheel, to permit it to be removed for the purpose of changing tires.

By the present invention many of the difficulties attending the removal of a rim from, or its application to, the wheel are obviated by pivotally mounting the lug, so that it may be swung about its pivot outwardly from the felly of the wheel, and at the same time swivelling the rim nut to the lug. With this arrangement all that is necessary is to unscrew the rim nut, and the lug swinging outwardly about its pivotal connection with the felly will ride below the rim, permitting it to be readily removed. Then when the rim is restored, all that is necessary is to tighten up the rim nut inasmuch as the lug will swing about its pivotal connection into the desired position to hold the rim on the wheel.

It is therefore one of the objects of the present invention to provide a means for mounting automobile demountable rims with which no hand manipulation other then turning the rim nut is required to remove or replace the rim. Another object of the invention is to provide a pivotal connection between the rim lug and the felly of the wheel in which there are no exposed hinges, and in which no alteration or addition need be made to the ordinary metallic felly other than the provision of holes through one of the vertical flanges thereof. Another object of the invention is to provide a one-piece rim lug which may be pivotally mounted on a wheel felly by means of a simple retaining pin such as a cotter pin, the pin being effectively protected and concealed by virtue of its location on the inside of the felly.

Other objects and features of novelty will be apparent from the following description taken in connection with the accompanying drawings.

In the drawings:

Figure 1 is a vertical cross section through a wheel having a demountable rim mounted thereon according to my invention;

Figure 2 is a view of the structure shown in Figure 1 showing the parts in position to permit the rim to be removed over the lug;

Figure 3 is a view similar to Figure 1 showing a modified arrangement for mounting a different form of rim;

Figure 4 is a side elevation of the structure shown in Figure 1;

Figure 5 is a side view of the wheel felly with the rim lug removed, and showing the holes provided for cooperation with the felly bolt and for the pivotal mounting of the rim securing lug;

Figure 6 is a perspective view of the rim securing lug, showing the inner or felly-engaging side thereof; and Figure 7 is a horizontal section along the line 7—7 of Figure 1, showing the connection between the lug and the felly.

Referring more particularly to the drawings, the invention is illustrated in connection with an automobile wheel, the felly of which is indicated generally at 10. The felly comprises a web 14, an outer flange 15, and an inner flange 11 having a tapered seat 12 to receive the inner edge of the rim indicated at 13.

As shown in Figure 1, the rim 13 is of the type having an outer ridge 16 which constitutes an annular inwardly directed flange integral with the rim and is adapted to be engaged by a rim securing lug to hold the rim wedged against the seat 12, and in alignment with the flange 15 of the felly.

The rim is provided with a plurality of rim bolts, generally from 4 to 8 in number, depending upon the size of the wheel. One of these rim bolts is shown at 20. This bolt has a head 21 which bears against the flange 11 and is provided with a rectangular neck 22 which passes through a rectangular aperture in the flange 11. The outer portion 23 of the bolt is cylindrical and threaded, and passes through a circular aperture 24 in the outer flange 15.

A nut 25 is adapted to be threaded on and movable along the outer end of the bolt 20, and comprises a polygonal head 26 having integral therewith a sleeve portion 27 terminating in an inner collar 28. Head 26 and collar 28 define between them an annular groove 29 which is adapted to provide a swivel mounting for the rim lug. The rim lug is indicated generally at 30, and as shown in Figure 4 comprises a metallic member of a substantially rectangular shape when viewed from the side.

Referring to Figure 6 it will be seen that the lug is provided with a relatively thin web 31 comprising a flat horizontal bottom 32 and a slightly curved, generally vertical, side 33. This central web portion 31 is bounded on either side by thickened vertical flanges 34, which join the thin web portion 31 to form the thin rounded top edge 52 of the lug. Due to the thickness of the side flanges 34 and the thinness of the inner web portion 31, the inside of the lug has a hollowed-out shape, as shown in Figure 6, and forms an enclosed space as shown in Figure 1 when the upper edge 52 of the rim-securing lug engages the rim.

The lug is provided with an elongated central aperture 37 by means of which the lug is swivelly mounted on the sleeve 27 of the nut 25, the inner collar 28 of the nut, adapted to bear against the curved inner web 33 of the lug, being received in the hollowed-out space bounded by the thickened side flanges 34 of the lug.

The lower ends of the two thickened side flanges 34 are provided with laterally extending projections 39 having curved ends 40. These laterally extending projections 39 are adapted to pass through holes 42 in the wheel felly as shown in Fig. 1. In that figure it will be seen that the lower edges 41 of the laterally extending projections 39 are very slightly above the web 14 of the wheel felly while the flat horizontal bottom portion 32 of the inner web of the lug is approximately flush with the exposed surface of the web 14 of the wheel felly. The lower horizontal surface of the web portion 32 of the lug is connected to the lateral projections 39 by the concave curved portion 43 forming part of the curved inner edge 44 of the horizontal bottom of the web which extends from side to side of the lug.

The projections 39 are provided with horizontal aligned holes 45 through which a cotter pin 46 is adapted to be passed to secure the rim-securing lug in a pivotal relation to the wheel felly.

It is to be noted that the extending projections 39 are quite close to the lower surface 32 of the bottom of the lug and are separated therefrom by a distance only approximately equal that of the thickness of the metal of the wheel felly. Referring to Figure 5 it will be seen that the holes 42 extend down very nearly to the bottom of the wheel felly.

Referring to the above description and to the drawings it will be seen that the rim-securing lug 30 is swivelled to a horizontally movable nut 25, and is also pivotally connected, at its end nearest the wheel hub, to the felly, so as to be capable of an outward swinging movement from the position shown in Figure 1 to that shown in Figure 2. When in the rim-securing position of Figure 1 the upper edge 52 of the lug bears against the rim and retains the latter in place, while in the outwardly-swung position of Figure 2 the upper edge 52 is below the lateral path of the rim.

In the form of the invention shown in Figure 3 the rim is not provided with a ridge as in Figure 1, but has a continuously smooth inner surface with rounded corners 54. In order to effectively engage this type of rim the rim-securing lug 30' has its vertical flanges 34' and its general curvature somewhat modified from the form shown in Figure 1. In the form of Figure 3 the vertical flanges 34' terminate at their upper extremities in curved surfaces 55 which conform to the curvature of the rounded corners 54 of the rim. In this form of the invention the lug is less curved than in the form of Figure 1 and extends in a more nearly vertical direction. The upper edge 52' of the lug extends high enough to engage the rim at the upper part of its rounded corner 54 and, together with the curved surfaces 55 of the vertical flanges holds the rim in place. In Figure 3 the nut and bolt are identical with those in Figure 1 and are designated by the same numerals. The other parts corresponding to those in Figure 1 are designated by the numerals used in Figure 1 with the addition of the primes.

In operation the nut 25 is unscrewed, which causes the inner collar 28 of the nut to engage the web 33 of the rim-securing lug to force it positively outward. Since the lower part of the lug is prevented from moving outwardly due to the engagement of the cotter pin 46 with the inner wall of the wheel felly, the rim-securing lug is forced to pivot about the cotter pin 46. As the nut 25 is moved outwardly the rim-securing lug rides about the cotter pin as a pivot until the outer end 52 of the lug is below the horizontal path of the innermost portion of the rim. This permits the rim to be readily removed and just as readily replaced. In the interval between which the rim is removed and replaced the lugs of the wheel will be positively retained in their outwardly swung position. This is an important feature since it prevents those lugs which are on the lower side of the wheel from swinging down against the felly, in which case they would interfere with the replacing of the rim. By merely tightening up the nut 25, the lug 30 is caused to swing upwardly and inwardly into rim engaging position. In this inwardly swinging motion of the lug its concave curved surface 43 rides about the adjacent corner of the felly, and the lower surfaces 41 of the inwardly extending projections 39 ride about the bottom surfaces in the holes 42 in the felly flange, as will be seen from a comparison of Figures 2 and 1.

From the foregoing description it will be apparent that the action of the rim lug is substantially automatic in that all that is necessary is to unscrew or tighten the nut 25 to remove or replace the rim as desired. Obviously there are no loose parts to fall off as the rim revolves or to be misplaced or lost in changing a tire. In addition there are no projecting parts except the rim-securing lug which has a smooth outer surface, and the nut 25. Due to the fact that the pivotal connection of the lug to the felly is effectively concealed, a very neat appearance is obtained and the possibility of injury to the pivotal connection is minimized.

Having thus described the invention, what is claimed as new and desired to be secured by Letters Patent is:

In a device for securing a demountable rim to a wheel, the combination of a bolt carried by the wheel, a nut member and a rim securing lug member thereon, one of said members having a groove and the other a flange engaged in said groove whereby said members are loosely but permanently swivelled together in such a manner that said lug member may be positively swung in either direction as the nut member is turned upon the bolt, a pair of hinge elements projecting from said lug member adjacent the end of the lug member nearest the wheel hub through perforations into the felly of the wheel, and pintle means inside of said felly for retaining said hinge elements, whereby said lug member is constrained to a pivotal movement about its end while being moved into and out of its rim securing position, said lug member being of such length that when in its outwardly swung position it allows the rim to be withdrawn over its free end.

In testimony whereof I hereunto affix my signature.

MATT GZUPKAYTIE.